United States Patent
Volpi et al.

(10) Patent No.: US 6,804,465 B2
(45) Date of Patent: Oct. 12, 2004

(54) WIRELESS OPTICAL SYSTEM FOR MULTIDIRECTIONAL HIGH BANDWIDTH COMMUNICATIONS

(75) Inventors: John P. Volpi, Garland, TX (US); Steven D. Roermerman, Highland Village, TX (US)

(73) Assignee: Incucomm, Inc., Dallas, TX (US)

( * ) Notice: Subject to any disclaimer, the term of this patent is extended or adjusted under 35 U.S.C. 154(b) by 81 days.

(21) Appl. No.: 10/090,270

(22) Filed: Mar. 4, 2002

(65) Prior Publication Data

US 2002/0126358 A1 Sep. 12, 2002

Related U.S. Application Data

(60) Provisional application No. 60/273,798, filed on Mar. 6, 2001.

(51) Int. Cl.[7] .......................... H04B 10/00; H04B 10/10
(52) U.S. Cl. ...................... 398/128; 398/130; 398/121; 398/124
(58) Field of Search .............................. 359/152, 172, 359/868, 169, 153; 398/128, 130, 121, 124

(56) References Cited

U.S. PATENT DOCUMENTS

| | | | |
|---|---|---|---|
| 5,149,949 A | * 9/1992 | Wike, Jr. ............... | 235/462.38 |
| 5,282,222 A | 1/1994 | Fattouche et al. | |
| 5,577,026 A | * 11/1996 | Gordon et al. ............... | 370/278 |
| 5,648,862 A | * 7/1997 | Owen .......................... | 398/128 |
| 5,774,247 A | * 6/1998 | Taglione et al. ............. | 398/121 |
| 5,786,923 A | * 7/1998 | Doucet et al. ............... | 359/118 |
| 6,348,986 B1 | * 2/2002 | Doucet et al. ............... | 359/152 |
| 6,381,055 B1 | * 4/2002 | Javitt et al. .................. | 359/152 |

OTHER PUBLICATIONS

OMNILUX, The Omnilux Solution, 2002, 7 pages, Pasadena, CA 91103.
OMNILUX, The Most Cost Effective Solution for Last–Mile Access, Omnilux System Overview, Key Benefits, Sep. 30, 2002, 6 pages, Pasadena, CA 91103.

* cited by examiner

Primary Examiner—Jason Chan
Assistant Examiner—Agustin Bello
(74) Attorney, Agent, or Firm—Haynes and Boone, LLP (57) ABSTRACT

This invention describes an optical communications system for optically networking computers and other devices together in a multi-user environment in a cost effective manner. This is accomplished through the use of low power (eye safe intensity) lasers, light emitting diodes, or photo diodes, to connect users in a time shared fashion through an optical multiplexing system (the optical access point) which can direct and manage the networking connection to each user device (user optical transceiver) independently. Both the optical access point and the user optical transceiver are capable of dynamically adjusting a beam to locate and align with each other.

43 Claims, 8 Drawing Sheets

WIRELESS OPTICAL SYSTEM FOR MULTIDIRECTIONAL HIGH BANDWIDTH COMMUNICATIONS

CROSS-REFERENCE

This application claims the benefit of U.S. Provisional Patent Application Ser. No. 60/273,798 filed on Mar. 6, 2001. This application is also related to U.S. Application Ser. No. 10/090,249, entitled WIRELESS OPTICAL SYSTEM FOR HIGH BANDWIDTH COMMUNICATIONS, filed on Mar. 4, 2002. The aforementioned applications are commonly assigned with the present invention and are incorporated herein by reference.

TECHNICAL FIELD

The invention relates in general to electronic communications systems, and in particular to a Wireless Optical System for Multidirectional High Bandwidth Communications.

BACKGROUND

There are many applications where computers and other devices require connection to a central network. Currently these network connections are established using either wired or radio frequency systems which each have their own limitations and costs. For example, there is a high dollar cost associated with running category 5 wiring to establish network connections due to the cost of the wiring, the labor involved to run the wiring, and the labor involved with termination of the wires as well as the removal of the wiring previously used to network the systems together. On the other hand, the utilization of Radio Frequency ("RF") communication may avoid some of the costs associated with copper wiring, but at the expense of physical security of the link since the information placed on the network via RF is typically easy to intercept and decode.

However, data signals for networks can be imposed upon optical signals, such as light, laser light and light from light emitting diodes (LEDs) by various types of modulation. On the other hand, it is common knowledge that optical signals have other problems. For instance, light reflects from surfaces it encounters creating multipath signal interference to one degree or another. Even with indoor, short range, applications, movement of an optical transmitter with respect to the optical receiver (due to very small changes in their position, for example as a byproduct of building movement or vibration of the surface(s) on which the node(s) are mounted) can produce unwanted multi-path interference on a time varying basis. The result is that the optical channel, though it is pure line-of-sight, is an extremely hostile channel. Thus, optical systems (i.e. laser- and/or LED based) typically are only used for short distances and in point-to-point (not omni-directional or multidirectional) systems where the cumulative atmospheric and multipath uncertainty is small. These systems typically can only establish reliable communication channels at levels well below the theoretical data transfer limits for optical systems.

What is needed, therefore, is a device to provide cost efficient deployment, fast installation, and secure optical communications to groups of users needing access to a central network.

SUMMARY

The previously mentioned needs are fulfilled with various embodiments of the present invention. Accordingly there is provided, in a first form, an optical communications system comprising a multi-directional optical transmitter/receiver adapted to receive transmit optical signals from multiple directions and a multitude of uni-directional optical transmitter/receivers adapted to communicate with the multi-directional optical transmitter/receiver, where the multi-directional optical transmitter/receiver dynamically adjusts a beam to locate and align with the unidirectional optical transmitters/receivers. Additionally, the uni-directional optical transmitter/receivers adjust their beams to locate and align with the multi-directional optical transmitter/receiver. Also provided is a method for optical communication between an optical access point and a user optical terminal comprising: searching for a signal from the user optical station, handshaking with the user optical station, registering the user optical station, determining the location of the user optical station, assigning the time slot for the user optical station, allocate a minimum capacity to the user optical station, allocate a priority to the user optical station, and establishing a network communication link between the optical access point and the user optical station.

Different embodiments of the invention overcome the limitations of security, the costs associated with the physical wiring, the labor to reroute wiring, and the limitations of where wiring can be quickly deployed when wired networking is used, to connect multiple users on a network.

A unique feature of one aspect of the present invention is the combination of multidirectional communication, digital processing, and network management which together minimizes the effects of the hostile optical channel. This is done by combining communication lasers and/or LEDs with optics that will direct the signal so as to limit the opportunity for reflections, and signal processing techniques to further limit the effect of multipath, and to reduce the effects of atmospheric degradation of the wireless transmission channel. This combination results in the ability to reliably provide performance at levels much closer to the maximum theoretical limits for a given distance between transmitter and receiver.

Another aspect of one embodiment of this system is the use of a reflective primary optical element for a panoramic coverage optical system. This permits the use of multi-spectral optical processing with wavelengths that differ greatly, but without the aberrations that refractive primary optics would generate. For infrared wavelengths in particular, this is of great benefit, since useful wavelengths often differ by a factor of two or more, making reflective optics very desirable. In a similar way, reflective optics provide benefits for other forms of optical diversity such as polarization. It is common knowledge that stress in refractive optics can create non-uniform transmittance of light with various polarizations. If polarization diversity is used as a degree of freedom or channel orthogonality, then such non-uniformity is undesirable. The benefits described here are not exhaustive, and reflective primary optics provide similar benefits to other forms of diversity not described here.

Another unique aspect of this system, particularly when implemented with a rotating reflecting body, is the opportunity to use different optical paths and power (or gain) for the transmit and receive functions through utilization of different portions of the reflective surface for the respective signals. This allows for reduction in self-interference, for simultaneous transmit and receive operation in a plurality of directions, and for the option of different solid angle coverage for the transmit and receive functions.

These and other features, and advantages, will be more clearly understood from the following detailed description taken in conjunction with the accompanying drawings. It is important to note the drawings are not intended to represent the only form of the invention.

BRIEF DESCRIPTION OF THE FIGURES

FIG. 1A is a isometric view of an optical access point incorporating one aspect of the present invention.

FIG. 1B is a side view of a mounted optical access point incorporating one aspect of the present invention.

FIG. 1C is a top view of an optical access point and a user optical transceiver.

FIG. 1D is a detail isometric view of an optical access point incorporating one aspect of the present invention.

DETAILED DESCRIPTION

The present invention provides a unique method and system for performing optical communications between a plurality of users and a network access point. It is understood, however, that the following disclosure provides many different embodiments, or examples, for implementing different features of the invention. Specific examples of components, signals, messages, protocols, and arrangements are described below to simplify the present disclosure. These are, of course, merely examples and are not intended to limit the invention from that described in the claims. Well-known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding control circuitry described herein are omitted, as such control circuits are within the skill of persons of ordinary skill in the relevant art.

Figure 1:
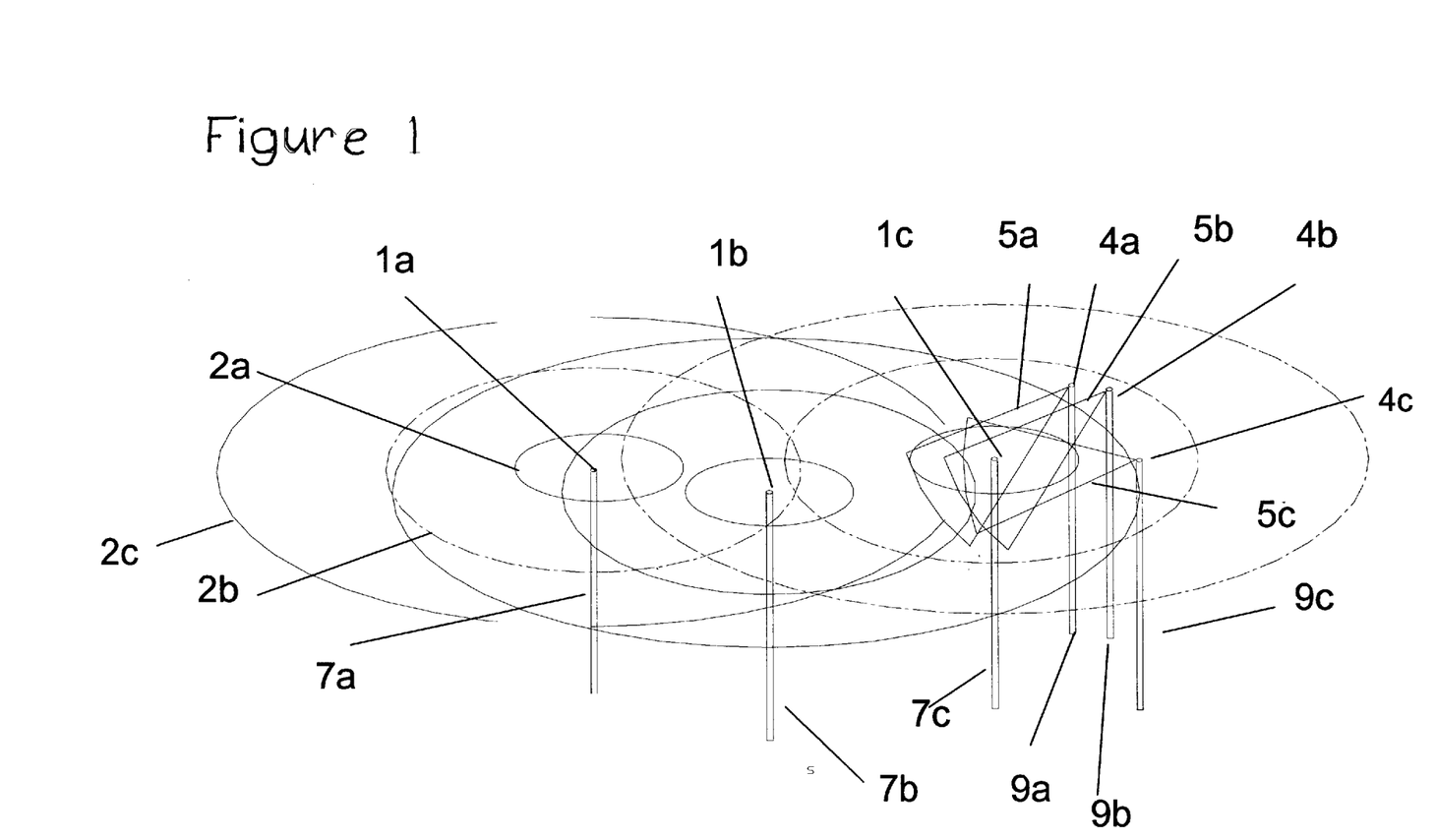
FIG. 1 is an optical networking system illustrating three optical access points which incorporates one aspect of the present invention.

Turning now to FIG. 1, there is illustrated a portion of an exemplary optical network having multidirectional transmitters and receivers. FIG. 1 shows three illustrative "optical access points" ("OAPs") 1a through 1c. The OAPs 1a–1c are network devices that interconnect two networks of different media, for instance an optical network to a wired network. In the embodiment illustrated in FIG. 1, the OAPs 1a–1c may be multi-directional optical transmitters and/or receivers (or multi-directional transceivers), which means that they can send and receive optical signals from multiple directions. For instance, the circles 2a through 2c illustrate a 360 degree coverage area of the OAP 1a. The OAPs 1a–1c may be mounted on poles 7a, 7b, and 7c, respectively. In one embodiment, the poles 7a, 7b, and 7c are hollow.

In this exemplary embodiment, there are also three user optical transceivers ("UOTs") 4a through 4c shown with their respective coverage area in the form of triangular patterns 5a, 5b and 5c. The optical transceivers 4a–4c are mounted on poles 9a, 9b, and 9c, respectively. In this example the transceivers 4a–4c are generally unidirectional, which means that their coverage area of space is limited to a particular region. The transceivers 4a–4c may also be referred to as user optical terminals or stations. The optical transceivers 4a–4c allow users of the network to communicate with the OAPs 1a–1c. The communication with the access points is made through line of sight channels between the hub transmit/receive OAPs 1a–1c and the user optical transceivers 4a–4c.

While FIG. 1 illustrates an example configuration with vertical pole mounting, the same features can be incorporated in an inverted arrangement suspended from a ceiling, or in a folded path system for wall mounting.

In the illustrative example, the OAPs 1a–1c are connected to a traditional computer network, such as an Ethernet network (not shown). The OAPs 1a, 1b, and 1c may be connected to the Ethernet network via traditional network cabling which may be located inside of the tubes 7a, 7b and 7c. Network users may use personal computers (not shown) to communicate with the Ethernet network. In this example, the personal computers are physically connected with wiring (not shown) to the optical transceivers 4a–4c. The wiring may be housed inside of the poles 9a, 9b and 9c. Thus, in this example, there is a physical connection between OAPs 1a–1c and the Ethernet network. There is also a physical connection between the optical transceivers 4a–4c and individual personal computers. However, there is an optical link between the OAPs 1a–1c and the optical transceivers 4a–4c.

In order to complete the communication link between one of the optical access points 1a–1c (for instance 1a) and one of the user optical transceiver 4a–4c (for instance 4a), the optical access point 1a searches for a signal from the user optical station 4a. Once such a signal is found, a handshaking routine may be performed between the user optical station 4a and the Ethernet network. Once the handshaking routine is completed, the user of the personal computer may be registered with a network manager coupled to the OAP 1a. The network manager may determine and store the location of the user optical transceiver 4a, assigns a time slot for the user transceiver 4a, and allocates some network capacity to the user optical transceiver 4a. The network manager may also allocate a priority to the user optical transceiver 4a such that a network communication link may be established between the user computer and the Ethernet network. To accomplish this task the network manager may determine and provide a mapping of the user optical transceiver 4a to a network time slot, given the location of the user optical transceiver 4a in the coordinates utilized by the optical access point in the search process described above. Further, the optical access point and user optical station may negotiate, over time, the amount of the time, and therefore the amount of data allowed to be transmitted, over the established connection.

From the perspective of a user transceiver, the user transceiver will attempt to be allowed onto the network. This process may include searching for a signal from the optical access point, the completion of a handshake with the optical access point, the determination of the relative location of the optical access point, an acknowledgment of the assigned time slot for the user optical station, an acknowledgment of the minimum capacity of the user optical station, an acknowledgment of the priority assigned to the user optical station, and the establishment of a network communication link between the user optical station and the optical access point. Further, the optical access point and user transceiver may negotiate, over time, the amount of the time, and therefore the amount of data allowed to be transmitted, over the established connection. Thus, once the optical link between the OAP and the UAT is established, a user using the personal computer may log into the network in a traditional manner. In some embodiments, multiple users can connect to the Ethernet network through one OAP.

Turning now to FIG. 1-A, there is illustrated a detail example of an optical access point (for instance OAP 1a) in optical communication with a user optical transceiver (for instance, the UOT 4a). Focusing now on the optical access point 1a, there is a optical energy director ("OED") or reflector 14. As will be explained later, the reflector 14 reflects the light signals such that the light path is generally perpendicular. In some embodiments, it may be desirable to cause the optical signals to be focused through use of a focusing len(s) 15 located below the reflector 14. Located below the focusing lens 15, are a series of optical interface areas 16a and 16b. There is a receive area 16a and a transmit area 16b. The receive area 16a and the transmit area 16b are separated by a guard area 18. The receive area 16 is an area which contains multiple optical receiving elements, such as optical receive element 26. The optical receiving device 26 may be any device which can receive a modulated light signal, including a photodiode, a photocell or a photomultiplier tube. Such light receiving devices are well known in the art.

In the transmit area 16b, there are multiple optical transmitting devices, such as optical transmitting device 31 which transmits a light signal. The optical transmitting device 31 may include any device capable of transmitting a modulated light source, including lasers or LEDs. In the illustrative embodiment, the optical transmitting device 31 and the optical receiving device 26 point in an upward direction. This upward orientation allows them to be directed vertically and at an angle to the vertical, providing the ability to steer the energy in a direction other than directly above their mounting position.

Coupled to the optical interface areas 16a and 16b, there are optical converters 19a and 19b. The optical converters 19a and 19b convert optical signals to electrical signals and vice versa so that communication may be established between the optical network and the wired network. Such optical converters are well known in the art.

There is a network manager 42 in communication with the optical converters 19a and 19b. The network manager 42 may provide several functions, such as converting of an incoming signal 10b from the wired network, under a particular protocol (e.g. Ethernet), into a protocol appropriate for optical transmission. The network manager 42 also handles and controls the way in which network users are admitted to usage of the network and administers their priority through either direct (e.g. via limits set by the Information Technology manager) or indirect ways (e.g., via automatic computer program control which adaptively assigns capacity and priority based on stored data from each user along with user usage patterns recognized by the network manager).

Turning now to the UOT 4a, there is a light transmitting device 23, which may be similar to the light transmitting device 31. Positioned adjacent to the light transmitting device 23, is a light receiving device 21, which may be similar to the light receiving device 26. The light transmitting device 23 and the light receiving element 21 are mounted in a way to keep them separated so that the light signals do not interfere with each other. Coupled to the light transmitting device 23 is an optical converter 45a, which converts electrical signals from a user's computer to modulated signals, which then can be transmitted by the light transmitting device 23. Similarly, there is an optical converter 45b which is coupled to a light receiving device 21.

The optical converter 45b converts the modulated signals received by the light receiving device 21 to electrical signals which can be then sent to the user's computer.

As described previously, the OAP 1a communicates with the UOT 4a via light signals. At the UOT 4a, optical signals 47a and 47b originate and terminate in a direction that is approximately horizontal. For instance, a signal from a user's computer is sent to the optical converter 45a through a wired communication path 46a. The signal is converted and modulated to an optical signal 47a which is transmitted by the light transmitting device 23. The optical signal 47a is sent in a generally horizontal direction towards a receive area of the reflector 14. As the signal 47a hits the reflector 14, it is reflected in a generally vertical direction towards the light receiving area 16a, where it is received by a light receiving element, such as light receiving element 26. The signal is then converted by the optical converter 19a to an electrical signal 10a, which is then sent to the network manager 42 which forwards the signal to the wired network.

Signals from the wired network, such as signal 10b, are sent to the network manager 42, which routes them to an appropriate optical converter 19b. The optical converter 19b converts and modulates the electrical signal so that an optical signal 8b can be transmitted by a light transmitting device, such as the light transmitting device 31. The optical signal 8b is transmitted in a generally vertical direction such that it hits the reflector 14, which reflects the optical signal 8a into a generally horizontal optical signal 47b. The optical signal 47b is received by the light receiving element 21 of the UOT 4a. Upon receipt by the light receiving element 21, the signal may be converted by the optical converter 45b to an electrical signal 46b, which can then be routed to the user's computer.

In the embodiment illustrated in FIG. 1A, the reflector 14 or optical energy director ("OED") is positioned above the optical converters 19a and 19b. The OED 14 provides a means of bringing transmitted optical signal path 8b to a generally horizontal orientation so that it may be brought into the line of sight of the UOTs. Similarly, the OED 14 also provides a means of bringing the received optical signal path 8a to a generally vertical orientation so that it may be received by the optical converter 19a. The optical signals may pass through a clear window 24, which enables the optical signals to enter and leave the OAP 1a. Components of the OAP 1a may be housed in an opaque optical tube 22.

By placing the OED 14 above other objects, energy is directed along a plane above objects that would otherwise degrade the signal paths, create blockage, and could contribute to multipath interference. While multipath interference is not eliminated by this configuration, the two dimensional nature of the primary signal path does significant reduce the effects of multipath interference.

The directional coverage of transmitters 17a and receivers 17b may be controlled by the following factors: (1) the shape of the OED or reflector 14, (2) whether the reflector 14 is fixed or rotating, (2) the location of the incident optical signals 47a, (3) whether the optical signals 47a are directed at a section of the OED 14, that reflects onto the "optical receiver" portion 16a of the OAP 1a or the "optical transmitter" portion 16b, of the OAP 1a.

FIG. 1B shows a full 360 degree coverage capability 29 for the OAP 1a, when mounted on a mounting pole 27. Such a coverage area is possible when a simple fixed body of rotation (e.g., a cone) creates a coverage pattern which is omni-directional in azimuth. The positioning of the OAP 1a on the mounting pole 27 allows the OAP 1a, to have unrestricted visibility to UOTs in the regions via the height at which it is mounted (e.g., above any possible surrounding obstructions). However, this 360 degree coverage may be restricted in vertical elevation coverage area 28 to limit the directions of incoming signals to those originating in an approximately horizontal direction.

FIG. 1C is a top view of the OAP 1a and an UOT 31. The OAP 1a maintains a full 360 degree coverage pattern 34, to enable it to communicate with one or more UOT 31 in a horizontal plane which is at substantially the same height as the OAP 1a. The UOT 31 transmits optical signals 32, which can be adjustable in either azimuth coverage, elevation coverage, or both while the UOT receive optical signal 33 is fixed in both azimuth and elevation coverage. Other embodiments of this invention may be implemented with the receive optical signal 33, possessing adjustable azimuth and elevation coverage, with the transmit optical signal 32, possessing fixed azimuth and elevation. Other embodiments may have combinations of fixed or adjustable azimuth and/or elevation beam coverage for both the transmit and receive sensors.

FIG. 1D shows an alternate means of mounting an optical transmit element 51 and an optical receive element 50 in an OAP 52. In this implementation the sensors are mounted to face horizontally such that they can receive and transmit optical signals from a second reflector 43, which receives and directs optical signals from and to the UOTs via the OED 53. The second optical reflector 43, may be implemented with a conventional mirror assembly (as shown) which may be advantageously mounted via a mechanism to rotate it in two axes, or a deformable mirror device (DMD), not shown, under electrical control for rapid and straightforward synchronous operation with the UOTs in view whose timing is controlled by the OAP 52. FIG. 1D shows, as an example, a relatively large mirror as the reflecting device 43, to illustrate the concept. This reflecting device 43, when rotated about it's horizontal axis 54 and/or it's vertical axis 55 provides for a variable coverage area for both the transmit and receive beams when a minimum number of devices is desired. This embodiment may allow wide area coverage with fewer devices as compared to the embodiment incorporating an annular ring as shown in FIG. 1A.

The embodiment described in reference to FIG. 1A may entail more cost due to a larger number of components. The embodiment uses a second reflective device 43, as mounted on the base 56, to enable rotation with the base about the vertical axis 55. This mounting and rotation mechanism facilitates the ability to direct and receive optical signals from UOTs in a wide range of azimuth and elevation, with respect to the OAP, enabling a differentiation of service and access via time sharing as well as location with respect to the OAP. In a time sharing arrangement between the OAP and a number of UOTs, each UOT is assigned a specified time allotment which coincides with the time when the OAP is directing an optical signal towards it. The UOT is only allowed to transmit and receive optical signals to and from the OAP during this time period. The network manager function handled by the OAP provides the coordination necessary to perform this task. This coordination includes a way for the network manager to map each UOT time slot into the direction in which the optical signals are provided by the OAP during the time slot which the network manager has reserved each UOT on the network, and a way for the UOT to learn this information through communication with the OAP over the optical link.

Figure 2:
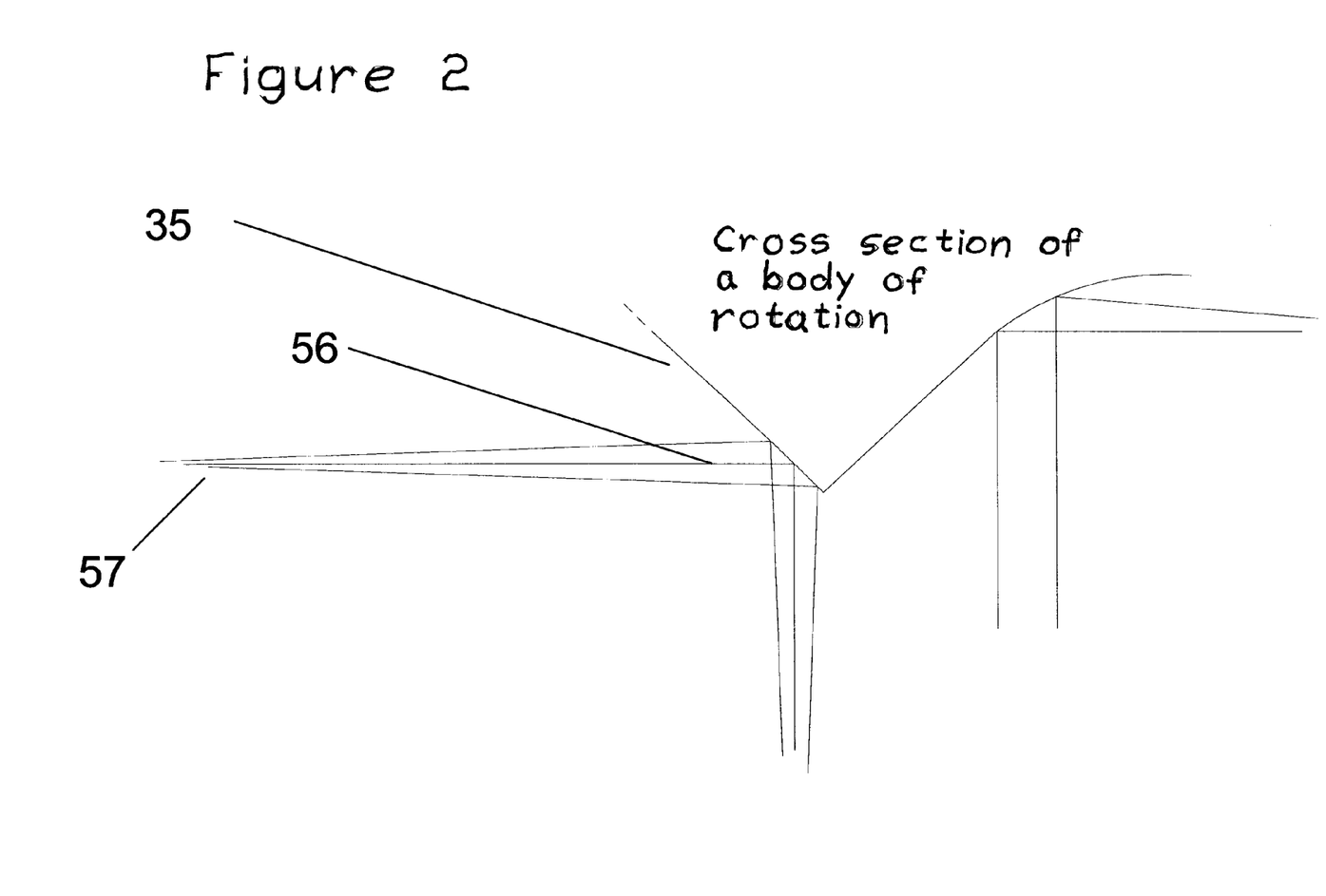
FIG. 2 is a detailed side view illustrating one embodiment of a reflector with multiple reflective surfaces.

An alternative method of controlling directional coverage, in a vertical direction is illustrated in FIG. 2 where elevation coverage is controlled by the extent of optical signal divergence 56 prior to reflection of the signal as it bounces off the reflector 35 and is directed downward toward optical receiving elements. The incoming optical signal 57 is shown as spreading or diverging 56 prior to it's illumination of the reflector 35. The shape of the reflector 35, can be used to control both elevation and azimuth coverage. In another embodiment, optical elements (not shown in FIG. 2) placed around the perimeter of the OED (for instance in clear window 24 in FIG. 1A) may be used to define divergence prior to reflection of the signal to the base of the OAP.

Yet, another alternative method of controlling directional coverage is rotation of the reflector 35. In this situation, a reflector 35 is selected based on it's special shape (from top to bottom) and solid angle of volume (to determine the angular coverage available at any one time). Rotation can be used to isolate various network elements in spatial or angular terms and, for example, to implement a time division protocol, or to obtain additional optical power (gain) through the use of a special optical configuration or formation of the reflector. Typically a stepper motor would then be utilized to precisely position the reflector at each of multiple locations, in repetitive fashion, to cover the full 360 degree azimuthal plane once each rotation. This duty cycle could be altered to provide more "connection time" to a particular user (defined at a particular angle from the reference origin point of the system) and less to other users as the system administrator (or network control software) allows based on user request(s).

The OED or reflector used in the embodiments described above may have a number of shapes. For instance, it could be generally conical in shape. For purposes of this application, the term "generally conical" may also mean conical, parabolic, or hyperbolic. The term "generally conical" also includes any shape having a smaller tip or vertex which widens into a wider portion. Furthermore, the term could also include a multi-facetted shape, which is generally shaped similar to a cone, parabola, or hyperbola.

In embodiments where the OED 14 is a body of rotation having a generally conical shape, a number of practical steps can be taken to improve the overall performance of the system. For example, the tip of the cone may be treated with a small amount of black paint or other non-reflective material in order to reduce the specular reflections associated with this portion of the reflector. Another example is the incorporation of an alignment hole in the reflector. In this case a small hole is made in the tip of the cone to allow direct viewing of the transmitter. The hole, along with appropriate alignment guides can assist in rapid optical adjustments to support quick deployment with minimal need for mounting adjustments. Another practical step is the inclusion of a dust cover plate whose diameter exceeds that of the reflector. The cover plate may also include a bubble level, an aiming sight, a corner reflector, or other aides to installation and alignment. These alignment aides are a practical improvement and may be used by a human installer, or in the case of the use of a corner reflector, may provide an automated alignment of a UOT to the OAP.

The basic design principles of the spinning and rotating primary reflector 14 are similar to those found in imaging scanning systems, and can be found in a number of lighting, imaging, and sensor applications, including coastal light houses, three dimensional image projection, and infrared guided weapons. Different aspects of the present invention could also include a fixed primary reflector with the scanning element near the source or focus point, or both fixed reflector, fixed source and moving reflector, fixed source embodiments.

FIG. 2 illustrates a particularly useful configuration for a reflective surface. A reflective body or cone, creates omni-directional coverage in azimuth, while the degree of elevation divergence is limited by the extent to which a simple combination of lenses and/or a scanner is used to control the divergence and coverage. The rest of a transmitter and receiver system are configured to utilize this (or other similar) reflector. This idea is further shown in FIG. 1A which details a possible embodiment with two annular rings of optical transmit elements 17a and optical receive elements 17b each for the transmit and receive functions respectively, with a guard bands 18 in-between them and in the center of the base. It is through these sensors (transmitters and detectors) that the reflected signals are processed. The angular resolution of the system (OAP), and therefore the coverage characteristic, is determined through a combination of sensor placement, focusing lens size, design, and placement, and the number of sensors available in the annular ring transmitters and receivers.

The OAP 1a (including the LED (or laser) transmitter and receiver) may be pivoted to provide a pendulous mass, thus providing self-leveling of the optical tube, which serves as a mast to elevate the reflector. This self-leveling by means of pivots may be dampened to avoid unwanted movement by means of the power and data connection cables, and by means of springs, appropriately placed to tether the unit in a vertical direction for best coverage. In addition to dampening, the manufacturing process can be controlled to induce random variations in the length of connection cables, making the damped motion of each tube somewhat independent of other tubes, and reducing or eliminating some common mode errors. If a stepper motor (not shown) is installed to drive the primary reflector it may be installed above the reflector, with power and assorted logic signals provided by very fine wires embedded in the window 24. Communications links to other transmitters and receivers (e.g. the UOTs) which are elevated to the same approximate height achieve clear line of sight above a cluttered environment (for example a large office space or factory floor) by means of this elevation, and while azimuth is omni-directional, a degree of optical gain (power) is preserved, and multipath is reduced through a restriction of the elevation coverage.

Figure 3:
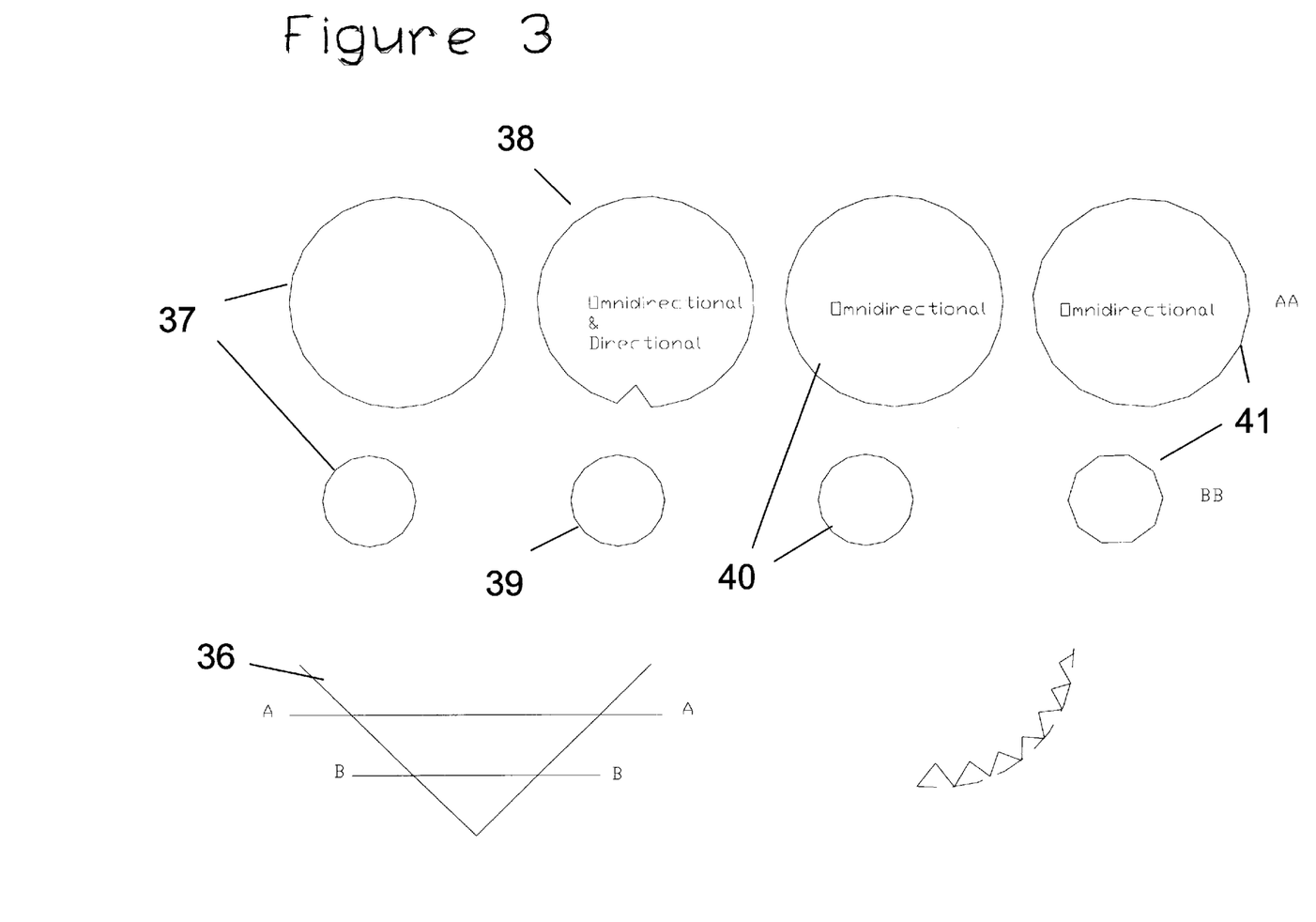
FIG. 3 is a cross-sectional view illustrating different embodiments of primary reflectors.

FIG. 3 illustrates a number of cross sections of a primary reflector 36. Starting from the left is shown a body of rotation 37, in which all cross-sections perpendicular to the vertical center are circles, this option would describe a cone. The next primary reflector shown is a configuration with an inscribed two dimensional corner reflector (in the upper section of the reflector 38) for the purpose of providing both omni-directional coverage (over the lower section of the reflector 39) and unidirectional coverage in a particular azimuth angle at higher signal to noise ratio for longer range and/or higher data rates for a particular user or group of users. The third example reflector 40, shows a configuration with long facets forming many small two dimensional corner reflectors. This configuration provides a different combination of specular to coherent reflection which can be used to provide useful coverage of the detector(s) in the receiver portion of the system when distant OAP light paths use coherent reflective surfaces and nearby OAP paths are somewhat diverged by specular surfaces. This permits the use of limited divergence beams without precision alignment for close OAPs, and limited scattering (negative gain) for distant OAPs. Finally, at the far right in FIG. 3, a faceted design 41 is shown. Note that the number of facets in cross section AA is not the same as the number of facets in cross section BB. The number of facets on any vertical row, and the offset of facet center row to row, represents two degrees of design freedom when this approach is used. If a small number of facets are used in a single row, this shape is reduced to a pyramid, which can be useful in certain network configurations. Items 38 and 39 show an example reflector where the receiving portion of the reflector has a different design than the transmitting portion.

The basic shape utilized to demonstrate the reflective surface of the OED 14 in FIG. 3 is a simple right cone as the body of rotation 37, but this is not the most interesting body of rotation, whether simple, faceted, or inscribed. Complex bodies, such as the one shown in FIG. 2, with surfaces that are sculpted for a particular purpose, are more forgiving in terms of sensor alignment between nodes than bodies with more simple shapes. Shapes of rotated concave or convex arcs, such as quadratic or circular patterns, provide better control of gain and coverage.

Figure 4:
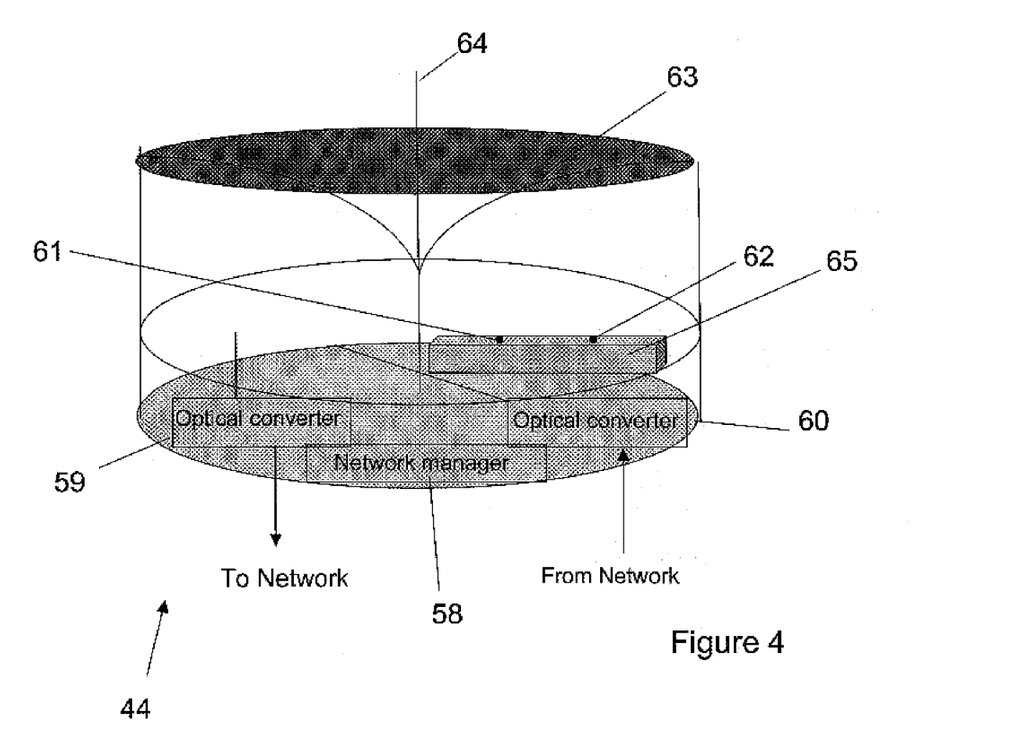
FIG. 4 is a detail view of a base section of the optical access point illustrated in FIG. 1A.

FIG. 4 shows a detailed view of an example base 44 of an optical access point which, in this embodiment, is configured with an optical receive element 62 and an optical transmit element 61 mounted horizontally on a mechanism 65 which both rotates about the vertical axis 64 of the base 44 and allows direct optical view of the optical energy director 63. The network manager 58 communicates with both optical converters 59 and 60 for the purpose of registering the user on the network and maintaining the connection.

A rotating reflector may introduce distortions. While these distortions may be inconsequential at microwave wavelengths, such distortions would have limited the usefulness of such a primary optical element in the signal processing of prior art. At useful (high) data rates, the degree of phase distortion caused by imperfections in the reflector, when combined with other effects previously described, such as multipath, can create inter-symbol interference which, in the limit, can render the system of little use if a mechanism or way of compensation is not provided. Consequently, the combination of this class of reflector as an optical element in the system (OED) coupled with the utilization of signal processing techniques (such as forward error correction, pilot tones, and turbo codes) may provide an important improvement in the system design, and enables the utilization of optical reflectors 14 where they otherwise would not be useful.

Another class of problem associated with the phase of the signal relates to vibration, or mechanical jitter, induced phase noise. When the motion of the mast (OAP in it's entirety) is considered, the effect can also be considered (experienced) as "low frequency fading" or "common mode fading" for the case where multiple masts move with common motion. Such common motion can be induced by a number of unwanted inputs of mechanical energy, such as building motion, air motion, vibration from building sources such as elevators and air conditioning equipment, and movement of people and objects. Here too, OFDM and other signal processing techniques (such as forward error correction, pilot tones, and turbo codes), provide an important part of the system design in that the use of these techniques allows for compensation for "signal fading" and "signal distortion". The use of mechanical stabilization, whether of the primary optical element, stabilization at the signal source, or in an intervening optical element, can be employed to provide additional phase noise and signal margin. When combined with stabilization, the signal processing described herein, along with the optical systems described herein, provides a very robust solution.

Though the systems described here have been shown for primarily indoor applications, similar configurations could be derived from those listed for high bandwidth outdoor applications where the presence of multipath and glint is reduced, compared to indoor environments. However, the atmosphere is less well behaved in outdoor applications, consequently the optical "channel" would be similarly hostile. For those cases, a variation of the multi-spectral OFDM system described above would provide similar performance improvements.

Although only a few exemplary embodiments of this invention have been described in detail above, those skilled in the art will readily appreciate that many modifications are possible in the exemplary embodiments. Accordingly, all such modifications are intended to be included in the scope of this invention as defined in the following claims.

What is claimed is:

1. An optical communications system comprising:
   a fixed position generally conical shaped reflective element having a longitudinal axis,
   a first optical transceiver adapted to be rotated about the longitudinal axis such that the first optical transceiver can send and receive optical signals to and from a second optical transceiver via a signal path which is reflected by the reflective element,
   wherein the reflective element and the first optical transceiver are housed within one unit.

2. The system of claim 1, wherein the first optical transceiver is coupled to an optical network for determining a location of the second optical transceiver.

3. The system of claim 2 further comprising an optical network manager, wherein the optical network manager is adapted to allocate network bandwidth to the second optical transceiver.

4. The system of claim 2 further comprising an optical network manager, wherein the optical network manager is adapted to coordinate in time access to the network.

5. The system of claim 1, wherein the system comprises a ring of focusing lenses adapted to focus light being transmitted to the second optical transceiver to increase usable signal strength of the optical signals.

6. The system of claim 1, wherein the system comprises a ring of focusing lenses adapted to focus light being received from the second optical transceiver to increase usable signal strength of the optical signals.

7. The system of claim 1 further comprising an opaque housing to house the reflective element and the first optical receiver, wherein the housing has an optically transparent region to allow the passing of the optical signals.

8. The system according to claim 1, further comprising a converter in communication with the first optical transceiver, the converter adapted to convert network signals into the optical signals utilizing an optical protocol for transmission across an optical link.

9. A system according to claim 1, further comprising a converter in communication with the first optical transceiver, the converter adapted to convert network signals into the optical signals utilizing an optical protocol for receiving signals across an optical link.

10. The system according to claim 1, wherein the reflective element is adapted to restrict optical coverage in a vertical direction to reduce unwanted signal reception.

11. The system according to claim 1, wherein the reflective element comprises multiple reflective surfaces to affect the optical signals such that signal-to-noise ratios of the optical signals are maximized.

12. The system of claim 1, wherein the reflective element comprises a plurality of reflective surfaces, wherein each reflective surface is used to communicate with a predetermined plurality of uni-directional transceivers.

13. The system of claim 1, wherein the reflective element comprises a plurality of reflective surfaces, wherein each reflective surface is used to transmit optical signals to a predetermined plurality of uni-directional transceivers.

14. The system of claim 1, wherein the reflective element comprises a plurality of reflective surfaces, wherein each reflective surface is used to receive optical signals from a predetermined plurality of uni-directional transceivers.

15. The system of claim 1, wherein the first optical transceiver comprises a steering mechanism to steer the transmit or receive beam to enable easier alignment between the uni-directional optical transceiver and the first optical transceiver.

16. An optical communications system comprising:
    a fixed position generally conical shaped reflective element having a longitudinal axis,
    a second reflective element adapted to be rotated about the longitudinal axis,
    a first optical transceiver adapted to send and receive optical signals to and from a second optical transceiver via signal paths which are reflected by the generally conical shaped reflective element and second reflective element, and
    wherein the reflective element and the plurality of optical transceivers are housed within one unit.

17. The system of claim 16, wherein the first optical transceiver is coupled to an optical network for determining a location of the second optical transceiver.

18. The system of claim 17 further comprising an optical network manager, wherein the optical network manager is adapted to allocate network bandwidth to the second optical transceiver.

19. The system of claim 17 further comprising an optical network manager, wherein the optical network manager is adapted to coordinate in time access to the network.

20. The system of claim 16, wherein the system comprises a ring of focusing lenses adapted to focus light being transmitted to the second optical transceiver to increase usable signal strength of the optical signals.

21. The system of claim 16, wherein the system comprises a ring of focusing lenses adapted to focus light being received from the second optical transceiver to increase usable signal strength of the optical signals.

22. The system of claim 16, further comprising an opaque housing to house the reflective element and the first optical receiver, wherein the housing has an optically transparent region to allow the passing of the optical signals.

23. The system according to claim 16, further comprising a converter in communication with the first optical transceiver, the converter adapted to convert network signals into the optical signals utilizing an optical protocol for transmission across an optical link.

24. The system according to claim 16, further comprising a converter in communication with the first optical transceiver, the converter adapted to convert network signals into the optical signals utilizing an optical protocol for receiving signals across an optical link.

25. The system according to claim 16, wherein the reflective element is adapted to restrict optical coverage in a vertical direction to reduce unwanted signal reception.

26. The system according to claim 16, wherein the reflective element comprises multiple reflective surfaces adapted to affect the optical signals such that signal-to-noise ratios of the optical signals are maximized.

27. The system of claim 16, wherein the reflective element comprises a plurality of reflective surfaces, wherein each reflective surface is used to communicate with a predetermined plurality of uni-directional transceivers.

28. The system of claim 16, wherein the reflective element comprises a plurality of reflective surfaces, wherein each reflective surface is used to transmit optical signals to a predetermined plurality of uni-directional transceivers.

29. The system of claim 16, wherein the reflective element comprises a plurality of reflective surfaces, wherein each reflective surface is used to receive optical signals from a predetermined plurality of uni-directional transceivers.

30. The system of claim 16, wherein the first optical transceiver comprises a steering mechanism to steer the transmit or receive beam to enable easier alignment between the uni-directional optical transceiver and the first optical transceiver.

31. An optical communications system comprising:
   a fixed position generally conical shaped reflective element having a longitudinal axis and a plurality of reflective surfaces,
   a plurality of optical transceivers positioned about the longitudinal axis in an annular ring such that the plurality of optical transceivers can send and receive optical signals to and from a second plurality of optical transceivers via signal paths which are reflected by the reflective element, and
   wherein each of the reflective surfaces is used to communicate with a predetermined plurality of uni-directional optical transceivers and the reflective element and the plurality of optical transceivers are housed within one unit.

32. The system of claim 31, wherein the plurality of optical transceivers are coupled to an optical network for determining a location of the second plurality of optical transceivers.

33. The system of claim 31 further comprising an optical network manager, wherein the optical network manager is adapted to allocate network bandwidth to the second plurality of optical transceivers.

34. The system of claim 31, further comprising an opaque housing to house the reflective element and the plurality of optical transceivers, wherein the housing has an optically transparent region to allow the passing of the optical signals.

35. The system according to claim 31, further comprising a converter in communication with the plurality of optical transceivers, the converter adapted to convert network signals into the optical signals utilizing an optical protocol for transmission across an optical link.

36. The system according to claim 31, further comprising a converter in communication with the plurality of optical transceivers, the converter adapted to convert network signals into the optical signals utilizing an optical protocol for receiving signals across an optical link.

37. The system according to claim 31, wherein the reflective surfaces to affect the optical signals such that signal-to-noise ratios of the optical signals are maximized.

38. The system of claim 31, wherein each reflective surface is used to transmit optical signals to the predetermined plurality of uni-directional transceivers.

39. The system of claim 31, wherein each reflective surface is used to receive optical signals from the predetermined plurality of uni-directional transceivers.

40. The system of claim 31, wherein each of the plurality of optical transceivers comprises a steering mechanism to steer the transmit or receive beam to enable easier alignment between the predetermined plurality of uni-directional transceivers and the plurality of optical transceivers.

41. The system of claim 32 further comprising an optical network manager, wherein the optical network manager is adapted to coordinate in time access to the network.

42. An optical communications system comprising:
   a fixed position generally conical shaped reflective element having a longitudinal axis,
   a plurality of optical transceivers positioned about the longitudinal axis in an annular ring such that the plurality of optical transceivers can send and receive optical signals to and from a second plurality of optical transceivers via signal paths which are reflected by the reflective element,
   wherein the reflective element and the plurality of optical transceivers are housed within one unit, and
   a ring of focusing lenses adapted to focus light being transmitted to the second plurality of optical transceivers to increase usable signal strength of the optical signals.

43. An optical communications system comprising:
   a fixed position generally conical shaped reflective element having a longitudinal axis,
   a plurality of optical transceivers positioned about the longitudinal axis in an annular ring such that the plurality of optical transceivers can send and receive optical signals to and from a second plurality of optical transceivers via signal paths which are reflected by the reflective element,
   wherein the reflective element and the plurality of optical transceivers are housed within one unit, and
   a ring of focusing lenses adapted to focus light being received from the second plurality of optical transceivers to increase usable signal strength of the optical signals.

* * * * *